G. W. BOWER.
SUSPENSION FOR TROLLEY WIRES AND THE LIKE.
APPLICATION FILED OCT. 19, 1920.

1,378,519.

Patented May 17, 1921.

Inventor:
George W. Bower,
by *Albert G. Davis*
His Attorney.

UNITED STATES PATENT OFFICE.

GEORGE W. BOWER, OF SCHENECTADY, NEW YORK, ASSIGNOR TO GENERAL ELECTRIC COMPANY, A CORPORATION OF NEW YORK.

SUSPENSION FOR TROLLEY-WIRES AND THE LIKE.

1,378,519.    Specification of Letters Patent.    Patented May 17, 1921.

Application filed October 19, 1920.  Serial No. 418,091.

*To all whom it may concern:*

Be it known that I, GEORGE W. BOWER, a citizen of the United States, residing at Schenectady, in the county of Schenectady, State of New York, have invented certain new and useful Improvements in Suspensions for Trolley-Wires and the like, of which the following is a specification.

The present invention relates to insulator suspensions such as are used for supporting overhead trolley wires and has for its object to provide an improved structure and arrangement in a device of this character.

For a consideration of what I believe to be novel and my invention, attention is directed to the accompanying description and the claims appended thereto.

Figure 1:
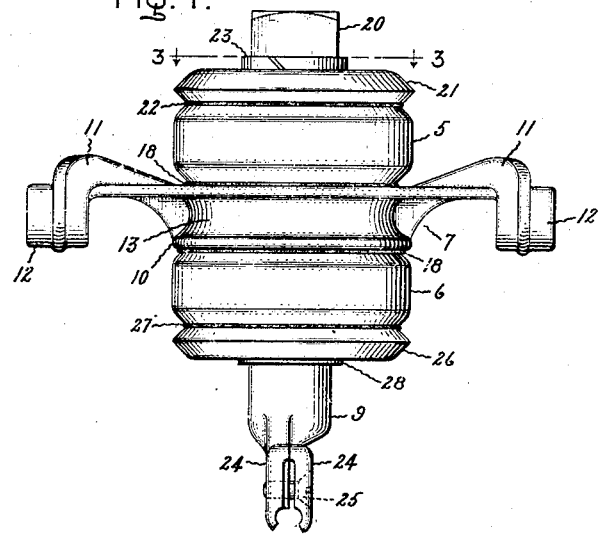
Figure 2:
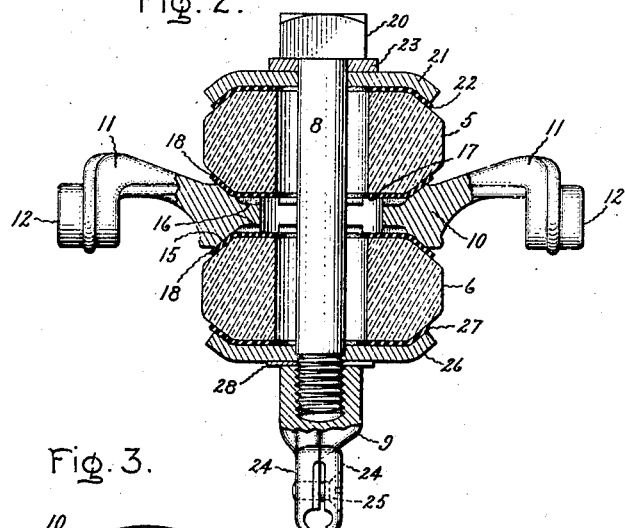
Figure 3:
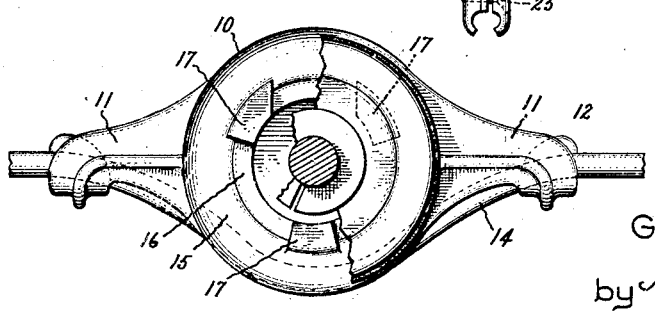

In the drawing, Figure 1 is a side elevation of a suspension embodying my invention; Fig. 2 is a vertical sectional view thereof; and Fig. 3 is a top plan view, with the bolt head omitted, a part of the upper insulator body being broken away to show the structure of the yoke which fastens on the span-wire.

Referring to the drawing, the suspension comprises two insulators 5 and 6, a yoke 7 for the span-wire, a holding bolt 8, and a trolley ear 9. Insulators 5 and 6 are preferably made of porcelain being in the form of knobs with holes through their centers through which bolt 8 extends. The corners of the insulators are beveled, as shown.

Yoke 7 comprises an annular body portion 10 from which project arms 11 provided at their ends with hooks 12 which engage around the span-wire. In the periphery of body portion 10 is a groove 13 for the span-wire. The manner in which such a yoke engages with a span-wire is well understood and is illustrated in Fig. 3 where a span-wire is shown at 14. The top and bottom surfaces of body portion 10 are concave being formed with sloping surfaces 15 to receive the beveled edges of insulators 5 and 6 and flat surfaces 16 upon which are three spaced pads 17 which form a three-point support for the insulators. Between each of the insulators and body portion 10 of the yoke is located a dished yieldable washer 18 which serves as a cushioning means between the insulators, usually porcelain, and the metallic yoke. Washer 18 may be made of fiber or other suitable yieldable material.

Bolt 8 has a head 20 at one end and a thread at the other end upon which the trolley ear screws. Between bolt head 20 and insulator 5 is arranged a rigid metallic washer 21 and a yieldable washer 22, the washer 22 being next to the insulator to form a cushioning member between it and the metallic washer 21. Directly under bolt head 20 is a split lock washer 23. Trolley ear 9 may be of any suitable structure and is shown as comprising a central portion which threads on to bolt 8, and clamping jaws 24 adapted to be squeezed into engagement with a trolley wire by a screw 25. Located between the trolley ear and insulator 6 are a rigid metallic washer 26 and a yieldable washer 27, the latter being next to the insulator so as to serve as a cushioning means. At 28 is a thin split washer which engages in the threads on bolt 8 and acts as a nut to hold the suspension insulator assembled in the absence of the trolley ear. For example, the suspensions may be shipped without trolley ears and in such case washer 28 holds the parts assembled.

The opening through the center of yoke 7 is of large diameter so the edge of the opening is spaced well away from bolt 8. The air gap thus formed serves as an insulator for insulating bolt 8 and hence trolley ear 9 from the yoke 7. Also the openings through insulators 5 and 6 are of ample size so bolt 8 passes freely through them without contact. These openings are made large so as to make the internal creepage distance from yoke 7 to bolt 8 a maximum. In the present instance, it will be noted that this internal creepage distance is substantially equal to the external creepage distance between washer 21 or 26 and yoke 7. This makes for ease of assembling and does away with any possibility of the insulators being broken when clamped up between the bolt head and the trolley ear in case the opening through the insulators are not in exact alinement. With the present arrangement either insulator is free to tilt somewhat in finding its seat on yoke 7 without possibility of coming into contact with the bolt. Washers 21 and 26 fit bolt 8 closely so as to close the opening through the center of the suspension and prevent the entrance of moisture. When the trolley ear is tightened up on bolt 8 thereby squeezing the insulators 5 and 6 between it and head 20, washers 21 and 26 serve to distribute the strains evenly over the surfaces of the insulators thereby preventing pressure being concentrated at one point which might cause the insulator to be broken. Because of the beveled edges of the insulators they will take a position to give them an even seat when being squeezed between washers 21 and 26 and the surfaces of yoke 7 and at the same time will be firmly held from transverse movement and will be evenly clamped.

The arrangement shown wherein the holding bolt passes freely through the center of the suspension and is adapted to turn therein is of great practical advantage in that it permits of the trolley ear being made to extend at any desired angle relatively to yoke 7 without affecting the clamping of the insulators, even though such ear forms one of the clamping members for the suspension. It will be seen that in use it is only necessary to turn the bolt to such a position that when the trolley ear is screwed home it will stand at the desired angle. If when the trolley ear is turned up tight, it does not stand at the desired angle, it can be quickly loosened again, the bolt turned slightly by the desired amount and the ear again screwed tight. Or, on the other hand, the trolley ear may be held at the desired angle and the bolt turned to tighten it up and clamp the insulator firmly between the trolley ear and the bolt head. In this connection it will be noted that at no point is there metal in direct contact with insulators 5 and 6, cushioning washers being provided at all points. This prevents the insulators from being crushed by the metallic parts between which they are clamped.

In manufacture suspensions built according to my invention can be made at a comparatively low cost for labor and materials and can be very quickly assembled. In case of breakage of any part a new part can be substituted by any workman without the use of special tools or materials and without scrapping any of the other parts of the suspension.

In accordance with the provisions of the patent statutes, I have described the principle of operation of my invention, together with the apparatus which I now consider to represent the best embodiment thereof, but I desire to have it understood that the apparatus shown is only illustrative and the invention may be carried out by other means.

What I claim as new and desire to secure by Letters Patent of the United States, is:—

1. In a suspension insulator, the combination of a yoke for engagement with a span-wire, said yoke having an opening through its center, an insulator located on each side of the yoke and provided with an opening in line with the opening in the yoke, a bolt having a head and a threaded end, said bolt extending through said openings, and a trolley ear threaded on the end of said bolt, said insulators being clamped between the bolt head and trolley ear, the opening through said yoke being of greater diameter than the bolt to provide an air gap for insulating purposes.

2. In a suspension insulator, the combination of a yoke for engagement with a span-wire, said yoke having an opening through its center, an insulator located on each side of the yoke and provided with an opening in line with the opening in the yoke, a bolt having a head and a threaded end, said bolt extending through said openings, a trolley ear threaded on the end of said bolt, and metallic washers located between the insulators and said head and trolley ear and serving to distribute the stresses uniformly over the insulators.

3. In a suspension insulator, the combination of a yoke for engagement with a span-wire, said yoke having an opening through its center, an insulator located on each side of the yoke and provided with an opening in line with the opening in the yoke, a bolt having a head and a threaded end, said bolt extending through said openings, a trolley ear threaded on the end of said bolt, metallic washers located between the insulators and said head and trolley ear and serving to distribute the stresses uniformly over the insulators, and cushioning washers located between said metallic washers and the insulators.

4. In a suspension insulator, the combination of a yoke for engagement with a span-wire, said yoke having an opening through its center, an insulator located on each side of the yoke and provided with an opening in line with the opening in the yoke, a bolt having a head and a threaded end, said bolt extending through said openings, a trolley ear threaded on the end of said bolt, metallic washers located between the insulators and said head and trolley ear and serving to distribute the stresses uniformly over the insulators, and cushioning washers located between said yoke and insulators.

5. In combination, a yoke having a central opening and supporting pads on opposite sides, annular insulators resting on said pads, a bolt extending through the openings in said insulators and yoke, said bolt having a head and a threaded end, and a trolley ear screwed on said threaded end, the insulators being clamped between said bolt head and trolley ear.

6. In combination, a yoke having a central opening and three pads on each side, annular insulators resting on said pads whereby they have a three-point support, yieldable washers between said pads and insulators, metallic washers engaging the ends of said insulators, yieldable washers between said metallic washers and said insulators, a bolt which passes through the openings in said yoke and insulators, and a head on one end of the bolt and a trolley ear on the other end between which said insulators are clamped, the opening through said yoke being of greater diameter than said bolt whereby an insulating air gap is provided between them.

In witness whereof, I have hereunto set my hand this 18th day of October, 1920.

GEORGE W. BOWER.